United States Patent
Chabanne et al.

(10) Patent No.: US 10,880,298 B2
(45) Date of Patent: Dec. 29, 2020

(54) METHOD FOR GENERATING A KEY AND ACCESS CONTROL METHOD

(71) Applicant: Safran Identity & Security, Issy-les-Moulineaux (FR)

(72) Inventors: Herve Chabanne, Issy-les-Moulineaux (FR); Jean-Christophe Fondeur, Issy-les-Moulineaux (FR); Julien Bringer, Issy-les-Moulineaux (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 15/668,551

(22) Filed: Aug. 3, 2017

(65) Prior Publication Data
US 2018/0041505 A1    Feb. 8, 2018

(30) Foreign Application Priority Data
Aug. 4, 2016   (FR) ...................... 16 57573

(51) Int. Cl.
*H04L 29/06* (2006.01)
*H04L 9/08* (2006.01)
(Continued)

(52) U.S. Cl.
CPC .......... *H04L 63/0861* (2013.01); *G06F 21/32* (2013.01); *H04L 9/0866* (2013.01);
(Continued)

(58) Field of Classification Search
None
See application file for complete search history.

(56) References Cited

U.S. PATENT DOCUMENTS

| 6,038,315 A * | 3/2000 | Strait ............. H04L 9/0662 382/115 |
| 6,986,046 B1 * | 1/2006 | Tuvell ............. G06F 21/6218 380/283 |

(Continued)

OTHER PUBLICATIONS

Juels et al.; A Fuzzy Commitment Scheme; 1999; Retrieved from the Internet <URL: https://dl.acm.org/citation.cfm?id=319714>; pp. 1-9, as printed. (Year: 1999).*

(Continued)

*Primary Examiner* — Saleh Najjar
*Assistant Examiner* — Michael W Chao
(74) *Attorney, Agent, or Firm* — Womble Bond Dickinson (US) LLP

(57) ABSTRACT

The invention relates to a method for generating a cryptographic key for applying an access control method to a resource of a server (20) by a client-terminal (10), the method comprising the following steps:

(E1) receiving a test biometric datum (DBtest),
(E2) applying a decoding method to the test biometric datum (DBtest) and of a reference datum (Dref) for obtaining a cryptographic key (K') such that:
  if the test biometric datum (DBtest) corresponds to the reference biometric datum (DBref), the cryptographic key generated (K') is the legitimate cryptographic authentication key (Kl),
  otherwise, the generated cryptographic key (K') is an illegitimate cryptographic authentication key (Ki) not allowing authentication of the client-terminal (10) at the server (20) during an access control, and
(E3) using the generated key for applying an access control method (F3) to a resource of the server (20) by the client-terminal (10).

17 Claims, 4 Drawing Sheets

(51) Int. Cl.
 *H04L 9/32* (2006.01)
 *G06F 21/32* (2013.01)
 *H04L 9/30* (2006.01)
(52) U.S. Cl.
 CPC ........ *H04L 9/3231* (2013.01); *H04L 63/0823* (2013.01); *H04L 9/0816* (2013.01); *H04L 9/0822* (2013.01); *H04L 9/0894* (2013.01); *H04L 9/30* (2013.01); *H04L 2209/34* (2013.01)

(56) References Cited

U.S. PATENT DOCUMENTS

| | | | | |
|---|---|---|---|---|
| 7,526,653 | B1* | 4/2009 | Vogel | G06F 21/32 382/115 |
| 9,037,858 | B1* | 5/2015 | Juels | H04L 9/3226 713/168 |
| 9,325,499 | B1* | 4/2016 | Juels | H04L 9/30 |
| 9,621,533 | B2* | 4/2017 | Isshiki | H04L 9/065 |
| 9,699,173 | B1* | 7/2017 | Roth | H04L 63/0846 |
| 10,248,771 | B1* | 4/2019 | Ziraknejad | G06F 16/51 |
| 10,454,677 | B1* | 10/2019 | Nagelberg | H04L 9/0866 |
| 10,594,688 | B2* | 3/2020 | Yang | H04L 9/0866 |
| 10,608,823 | B2* | 3/2020 | Mandal | H04L 9/3247 |
| 10,621,584 | B2* | 4/2020 | Thatte | H04L 9/0825 |
| 2003/0174840 | A1* | 9/2003 | Bogan | H04L 9/0894 380/277 |
| 2004/0139315 | A1* | 7/2004 | Tokutani | H04L 63/0435 713/156 |
| 2006/0123239 | A1* | 6/2006 | Martinian | H04L 9/3231 713/186 |
| 2006/0123241 | A1* | 6/2006 | Martinian | H04L 9/0866 713/186 |
| 2007/0180261 | A1* | 8/2007 | Akkermans | G06K 9/00885 713/186 |
| 2007/0253608 | A1* | 11/2007 | Tulyakov | G06K 9/00073 382/125 |
| 2008/0072063 | A1* | 3/2008 | Takahashi | H04L 9/0866 713/186 |
| 2008/0172725 | A1* | 7/2008 | Fujii | G06F 21/32 726/5 |
| 2009/0147958 | A1* | 6/2009 | Calcaterra | H04L 9/0833 380/260 |
| 2011/0191837 | A1* | 8/2011 | Guajardo Merchan | G06F 21/32 726/6 |
| 2012/0131350 | A1* | 5/2012 | Atherton | H04L 9/3231 713/186 |
| 2013/0326220 | A1* | 12/2013 | Connelly | H04L 63/045 713/168 |
| 2015/0095654 | A1* | 4/2015 | Li | H04L 9/0866 713/186 |
| 2015/0341350 | A1* | 11/2015 | Mandal | H04L 63/0861 726/6 |
| 2016/0112415 | A1* | 4/2016 | Park | H04L 63/0861 713/186 |
| 2016/0164682 | A1 | 6/2016 | Hartloff et al. | |
| 2016/0373417 | A1* | 12/2016 | Mandal | H04L 9/3231 |
| 2017/0076145 | A1* | 3/2017 | Gottemukkula | G06K 9/00228 |
| 2017/0193628 | A1* | 7/2017 | Sharma | G06T 1/0064 |
| 2017/0373858 | A1* | 12/2017 | Mandal | H04L 9/0869 |
| 2018/0316653 | A1* | 11/2018 | Kanza | H04L 63/0876 |
| 2019/0036699 | A1* | 1/2019 | Negi | H04L 9/0816 |
| 2019/0238344 | A1* | 8/2019 | Kaga | G06F 21/32 |
| 2019/0327092 | A1* | 10/2019 | Kareti | H04L 9/0891 |

OTHER PUBLICATIONS

Kikuchi et al.; Privacy-preserving similarity evaluation and application to remote biometrics authentication; 2009; Retrieved from the Internet <URL: https://link.springer.com/article/10.1007/s00500-009-0449-6>; pp. 1-8, as printed. (Year: 2009).*

Pedersen; Non-Interactive and Information-Theoretic Secure Verifiale Secret Sharing; 1992; Retrieved from the Internet https://jim.com/security/pedersons_secret_sharing.pdf; pp. 1-12, as printed. (Year: 1992).*

Search Report and Written Opinion in French Application No. 1657573 dated Apr. 18, 2017, with English translation coversheet.

* cited by examiner

METHOD FOR GENERATING A KEY AND ACCESS CONTROL METHOD

GENERAL TECHNICAL FIELD

The invention relates to the field of authentication of a client at a server, via biometric information, for access control of the client to a resource of the server.

The invention is notably directed to the protection of biometric reference data. For this purpose, the invention also relates to the generation of a cryptographic key for said authentication for an access control.

The client to be identified is associated with a physical device, such as a mobile phone, a digital tablet, a personal computer. This will be more generally referred to as a client-terminal.

In the case of biometrics, the client-terminal comprises means for acquiring biometric data (detector, camera, USB stick with a sensor, image sensor with an extraction module and a software solution, etc.).

It is important that the biometric reference datum, for example a fingerprint, an eye iris, etc. is not stored in plain text at the client, i.e. locally.

To do this, encryption techniques known under the name of biometric encryption (BE) are applied. We refer to document [CRYBIO] which describes in more detail these aspects (the references are given at the end of the description).

On the other hand, the biometric reference datum should not be either transmitted to the server for authentication. This latter condition imposes that the comparison of the acquired biometric datum and of the reference biometric datum is carried out locally.

Because of noise (scratches, times, deformations, etc.), the reference biometric measurements and the test measurements are different for a same user. This degrades the performances of the systems for checking biometric data. In order to measure these performances, two error rates are commonly used.

The FAR (False Acceptance Rate) is the probability that an illegitimate user is falsely accepted as legitimate.

The FFR (False Rejection Rate) which is the probability that a legitimate user be falsely rejected.

STATE OF THE ART

When a user wishes to be able to authenticate his/her client-terminal at a server for accessing a resource of the server, a test biometric datum is acquired and is compared with the reference biometric datum. If both of these data are sufficiently close, a cryptographic key is unlocked, which allows authentication at the server. No biometric information is thereby transmitted to the server.

In the methods of biometric encryption, the reference biometric datum is masked in the client-terminal by means of a random value and/or of the cryptographic key. This is generally referred to as key-binding. Mention may be made of secure sketches algorithms for example.

In particular, within the scope of the FIDO standard, a local biometric authentication is successful when it is followed by a conventional cryptographic authentication at a server.

On the other hand, because of the FAR and as the server only authenticates the client when the key is unlocked, brute force attacks are possible: A plurality of data simulating biometric data is tested locally, until a key is unlocked. The document [WEAK] describes the weaknesses of the present systems.

These attacks have the goal of either accessing information of the server, or obtaining information relative to the reference biometric datum, or further obtaining the associated cryptographic key. Indeed, if the authentication is authorized, this means that the tested biometric datum is close to the reference biometric datum.

It is capital to be able to guard against this type of attack.

Within the scope of the invention, it is considered that the attacker does not access the details of the calculations which are executed in the client-terminal. On the other hand, this terminal may be observed from a distance. In this way, the attacks by acquiring data via a magnetic probe in proximity to the client-terminal, as described in the reference [PROBE] are not targeted.

PRESENTATION OF THE INVENTION

The invention relates to a method for generating a cryptographic key for authenticating a client-terminal at a server in order to carry out an access control.

According to an aspect of the invention, the method for generating a cryptographic key for applying an access control method to a resource of a server by a client-terminal, the method being applied by the client-terminal, said terminal being configured for communicating with the server, the client-terminal comprising a memory in which is stored a reference datum obtained by applying an encoding method to a reference biometric datum and a legitimate cryptographic key giving the possibility of authenticating the client-terminal at the server during an access control, comprises the following steps:

(E1) receiving a test biometric datum, (E2) applying a decoding method to the test biometric datum and the reference datum for obtaining a cryptographic key such that:

if the test biometric datum corresponds to the reference biometric datum, the generated cryptographic key is the legitimate cryptographic authentication key, otherwise, the generated cryptographic key is an illegitimate cryptographic authentication key not allowing authentication of the client-terminal at the server during an access control, and (E3) using the generated key for applying an access control method (F3) to a resource of the server through the client-terminal.

In an embodiment, the method further comprises a preliminary step (E0) for generating the test biometric datum, either by acquisition via biometric datum acquisition means, or by digital generation.

In an embodiment, the encoding method is of the "secure sketch" type, such as a Fuzzy Commitment Scheme, or of the Helper Data System type, or of the Fuzzy Vault type for example with Reed-Solomon codes.

In an embodiment: the step (E2) for generating the cryptographic key comprises the application of an error decoding method.

In an embodiment, the error decoding method is a soft decoding method, preferably with a limited number of iterations, for example by a limiting number or by a stopping quality criterion.

In an embodiment, the legitimate cryptographic key has a format adapted for the use of the key in an access control protocol by authentication applied between the client-terminal and a server, and the decoding method is adapted so that the illegitimate cryptographic key has the format of the legitimate cryptographic key.

In an embodiment, the method for decoding and the encoding method comprise honey encryption and decryption steps.

In an embodiment, the encoding method is applied on a plurality of concatenated legitimate keys, the legitimate keys giving the possibility of authenticating the client-terminal at several respective servers and/or resources during an access control, and wherein the decoding method gives the possibility of obtaining a concatenated generated key comprising a plurality of generated keys concatenated with each other, the method advantageously comprising a step for selecting one of the generated keys from among the plurality of generated keys for its use in an access control method to the server and/or to a resource associated with the legitimate key which allowed generation of said generated key.

In an embodiment, the matching between two biometric data means that the distance between both biometric data is less than a given threshold.

The embodiments may be combined, depending on the technical feasibility.

The invention also relates to an access control method of a client-terminal to a resource of a server, from the preceding key generation method.

According to an aspect of the invention, the access control method of a client-terminal to a resource of a server, comprises the following steps:

(F1) applying a method for generating a cryptographic key as defined earlier, (F2) receiving by the server of the key or of data depending on the key, (F3) analyzing the key or said data depending on the key by the server:

if the key is a legitimate key, authentication of the client-terminal at the server and access of the client-terminal to the resource of the server, if the key is an illegitimate key, failure of the authentication of the client-terminal at the server and application of an alert method (F4) indicating that the test biometric datum does not correspond to the reference biometric datum.

In an embodiment, the alert method (F5) comprises at least one of the following steps:

storing the number of iterations of receptions of illegitimate keys, and/or sending a set value for locking the client-terminal, and/or biased authentication of the client-terminal at the server, so as to be able to monitor said client-terminal, and/or destruction of the data stored on the client-terminal and/or on the server, and/or, sending to the client-terminal a set value for re-acquiring test biometric data.

In an embodiment, the method comprises the application of a protocol for zero-knowledge proof.

In an embodiment, the exchanges between the client-terminal and the server comprise the application of an electronic signature, such as FIDO or ECDSA or further RSA.

In an embodiment, the method applies commitment scheme according to Pedersen comprising an enrollment sentence wherein the client-terminal stores a random quantity r, the client-terminal generates commitment MG in the form of MG (r, K1)=$g^{K1}h^r$ and sends it to the server which stores it, wherein K1 is the legitimate key, and g and h are such that $\log_g(h)$ is not known, and comprising a revealing phase, wherein, prior to the step for transmitting the key (E3), the following sub-steps are applied:

the client-terminal sends to the server:

$$A_1 \cdot A_2 = g^{\alpha 1} \cdot h^{\alpha 2}$$

the server generates and sends a random value c to the client-terminal, the client-terminal calculates $$y_1 = \alpha_1 + K' \cdot c \text{ et } y_2 = \alpha_2 + r \cdot c$$

wherein K' is the cryptographic key generated by the decoding method (E2, F1) and $a_1$ and $a_2$ are random values, the transmission step (E3) comprises the sending of $y_1$ and $y_2$ to the server, the step for analyzing the key (F3) comprises the following verification:

$$g^{y_1}h^{y_2 = MG^c}A_1A_2$$

The embodiments may be combined, according to the technical feasibility.

The invention also relates to a calculation unit which may apply generation methods as described earlier or a portion of the access control methods described earlier. Said calculation unit comprises a memory, a computer and a communication interface with a server. The calculation unit may be a private device of an individual, of the mobile telephone type, of the digital tablet type or further of a personal computer type.

The invention also relates to computer program products comprising instructions for applying the earlier generation method and/or all or part of the preceding access control methods. The computer program products therefore comprise instructions for the terminal and/or for the server.

PRESENTATION OF THE FIGURES

Other characteristics, objects and advantages of the invention will become apparent from the following description, which is purely illustrative and non-limiting, and which should be read with reference to the appended drawings, wherein.

DETAILED DESCRIPTION

Figure 1:
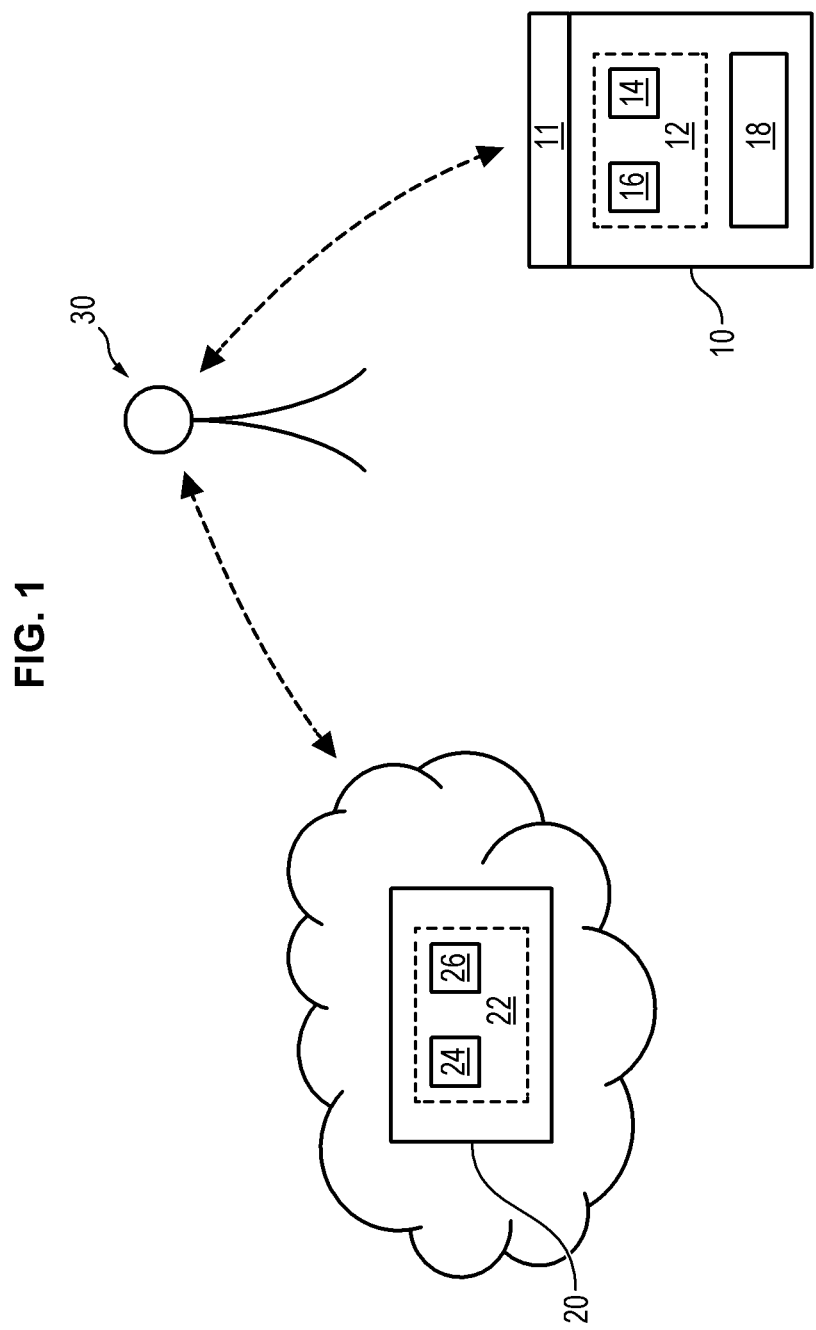
FIG. 1 illustrates a system for authenticating a client-terminal at a server.

With reference to FIG. 1, a system giving the possibility of authenticating a client represented as a client-terminal 10, is illustrated at a server 20 for controlling access to a resource of the server. By resource, is meant data, applications or further services of the server 20.

The client-terminal 10 belongs to a user called legitimate user.

The client-terminal 10 and the server 20 may communicate between them either directly, for example by a radiofrequency signal, or via a network 30.

The client-terminal 10 appears as a performing mobile telephone such as a smartphone, or else a digital tablet, or further a computer.

The client-terminal 10 comprises a calculation unit 12 notably provided with a memory 14 and with a computer 16.

The client-terminal 10 may either be used by a legitimate user to which it belongs, i.e. a non-fraudulent user, or else by an ill-intentioned user, i.e. a fraudulent user. This fraudulent user may either be a person, or a digital entity.

The memory 14 may be in the form of a flash memory, or else of a read only memory, of the ROM type, or further a random access memory RAM. The memory 14 may also be in the form of an external storage, configured for being physically connected to the calculation unit 12, for example through a USB port.

The computer 16 is a microprocessor, a processor, or a microcontroller able to perform calculations and in particular to apply encoding or decoding algorithms, of the "key binding" type. The computer 16 is notably configured for executing code lines from a computer program.

Advantageously, the client-terminal 10 comprises means for acquiring biometric data 18. These means 18 give the possibility of acquiring an iris or a fingerprint for example. Mention may be made for example of an image sensor coupled with a software module for extracting a biometric datum.

The acquisition means of biometric data 18 may be integrated to the client-terminal 10 or external data, but which may be connected to the latter. For this, acquisition devices are known which are connected by a wired connection to a computer.

The server 20 itself also comprises a calculation unit 22 notably provided with a memory 24 and a computer 26. The server 20 is typically a cloud server, i.e. delocalized.

The memory 24 may be in the form of a flash memory, or else a read only memory, of the ROM type, or further a random access memory RAM. The memory 24 may also be in the form of an external storage, configured for being physically connected to the calculation unit 22, for example through a USB port.

The computer 26 is a microprocessor, a processor, or a microcontroller able to perform calculations and in particular to apply authentication algorithms. The computer 26 is notably configured for executing code lines from a computer program.

The two calculation units 12, 22 advantageously comprise communication interfaces 11, 21 at a distance for sending and receiving data, notably through the network 30.

The network 30 is either an internet network, a wired network (Ethernet) or a wireless network (Wi-Fi), or a telephone network GPRS, EDGE, 3G or 4G or other, or a local network, or a radiofrequency signal network. The communication interfaces 11 and 21 are adapted so as to allow communication depending on the relevant network 30.

When the operations do not require that the information be transmitted between the client-terminal 10 and the network 20, this is referred to "local" processing.

Figure 2:
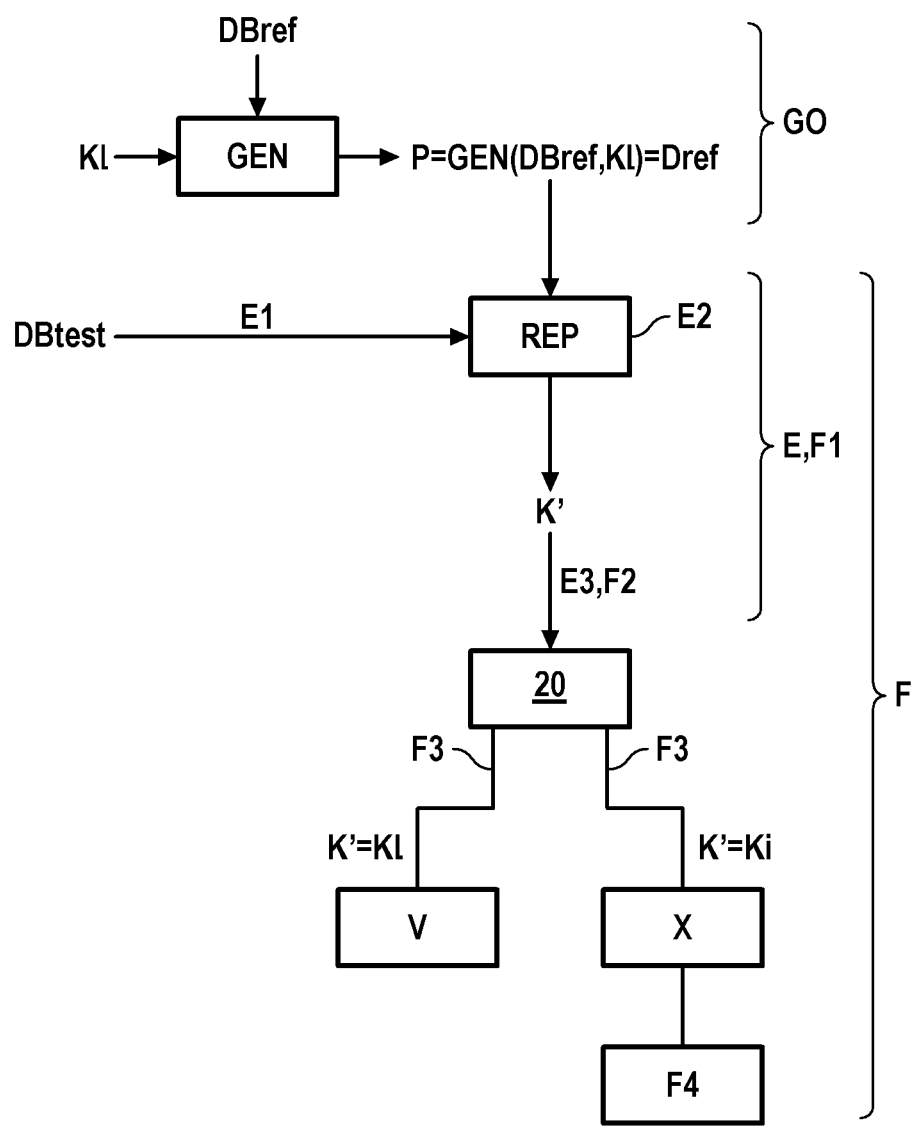
FIG. 2 illustrates the general operation of the invention.
Figure 3:
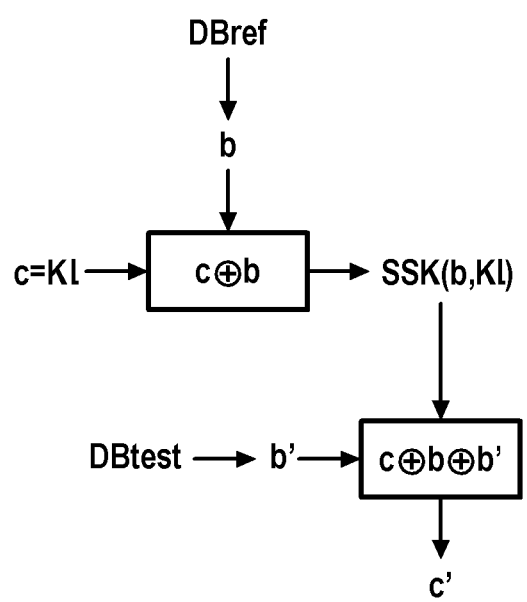
FIG. 3 illustrates a particular embodiment of secure sketch, with a fuzzy commitment scheme.

With reference to FIGS. 2 and 3, a method E for generating a cryptographic key will be presented. This method E is directed to generate a cryptographic key regardless of the input DBtest test biometric datum.

The authentication of the client-terminal 10 at the server 20 is accomplished by means of a legitimate cryptographic key Kl. If the server recognizes this key, the user is authenticated and the access to the resource of the server 20 is validated.

With the legitimate user, is associated a reference biometric datum DBref. In the case of key-binding, this DBref datum is not stored as such in the memory 14 of the client-terminal 10. Indeed, by means of an encoding method GEN, called key-binding method, the legitimate cryptographic key Kl is combined with the reference biometric datum DBref, for generating a reference datum Dref, stored in the memory 14. The GEN method is applied from Kl and BDref for obtaining at the output Dref.

This datum therefore gives the possibility of biometric authentication of the user at the server 20. This is therefore the biometrics of the user which conditions the authentication at the server 20 for the access control.

At the end of this encoding method GEN, the reference biometric datum DBref and the legitimate cryptographic key Kl may be destroyed so as not to be stored in clear text locally.

The encoding method GEN is a preliminary step G0 for applying the method E for generating a cryptographic key which will be described below.

In a first step E1, a test biometric datum DBtest is received by the calculation unit 12 of the client-terminal 10. As indicated earlier, this biometric datum BDtest is obtained either beforehand with the acquisition means 18, or with a digital generation.

In a second step E2, the computer 16 applies a decoding method REP to the test biometric datum DBtest and the reference datum Rref, so that it generates a cryptographic key K' regardless of the test biometric datum BDtest.

The decoding method REP is functionally related to the encoding method GEN. These methods may be of the "secure sketch" type like the "fuzzy commitment scheme", or further of the "fuzzy vault" type, "helper data system" type, etc. The embodiment of the fuzzy commitment scheme will notably be described subsequently.

If the test biometric datum BDtest corresponds to the reference biometric datum BDref, the cryptographic key K' is the legitimate cryptographic authentication key Kl (K'=Kl).

If the test biometric datum BDtest does not correspond to the reference biometric datum BDref, the cryptographic key K' is an illegitimate cryptographic authentication key Ki (K'=Ki≠Kl).

The matching between the biometric data may be accomplished in different ways. Notably methods for measuring the Hamming distance are notably known, or methods with a statistical distance or further measurements of similarity levels.

The illegitimate key Ki does not allow authentication of the client-terminal 10 at the server 20.

Finally, in a third step E3, the generated key K', which is either legitimate or illegitimate, is used for applying a method for access control of the client-terminal 10 at the server 20.

In an embodiment, the use of the key K' may simply consist of transmitting the key to the server 20 by means of the interface 11, so that the latter applies a method for access control of the client-terminal 10 at a resource of the server 20.

In another embodiment, the use does not imply the direct transmission of the generated key K', but implies operations for proof of knowledge, so that only one transmission of a datum associated with the key is carried out: it is thus possible to provide that the key K' be transmitted in a masked way. In this case, a distinct datum of K' but generated from the latter is transmitted by the client-terminal 10 to the server 20. In this case, this will be referred to as data depending on the key. This for example is the case during Pedersen commitment scheme, which will be described subsequently. This type of method allows improved protection of the data.

Thus, by means of this method, a key K' is systematically generated, so that the exchange of information between the client-terminal 10 and the server 20 are not accomplished exclusively if the legitimate key Kl is generated. As this will be described subsequently, the server 20 may then be informed that a ill-intentioned user is trying to be authenticated fraudulently from the client-terminal 10.

Before describing a method for access control F of the client-terminal 10 at the server 20 by means of the generated key K', different embodiments of the key-binding and of the encoding methods GEN and the decoding methods REP will be given.

In an embodiment illustrated in FIG. 3, a particular embodiment of a secure sketch, the fuzzy commitment scheme, is used, i.e. a coding algorithm based on the use of an error corrector code. The fuzzy commitment scheme is described in the document [FCS], (section I.A).

In the preliminary encoding step G0, the encoding method GEN appears in the following form:

Binarize the reference biometric datum BDref, in order to obtain a datum b,

From a word c of an error corrector code, obtained from the reference a result such that SSK=[c XOR b, h(c)], wherein XOR is the "exclusive or" function, and h is a cryptographic hashing function, for example of the SHA-256 type, Recording the result SSK locally, the word c is in fact a code word generated from the legitimate cryptographic key Kl (a code word is the re-writing of an original message wherein the redundancy has been added) and SSK is the reference datum DBref.

It is also possible to store h(Kl) instead of h(c).

This step is explained in the introduction of [FCS].

In the decoding step E2, the decoding method REP appears in the following form:

binarize the test biometric datum DBtest, in order to obtain b', calculate c XOR b XOR b' from the datum SSK, in order to obtain c'.

The word c' is the cryptographic key K'. If b' and b are sufficiently close, one has c=c', therefore K'=Kl. If b' and b are not sufficiently close, K'=Ki.

In the case of an FCS, the notion of sufficiently close is preferably calculated with a Hamming distance between b and b' (see introduction of [FCS]).

In a first example, in order to ensure that the decoding method REP systematically generates a key, even if b and b' are not sufficiently close, an error decoding method, called soft decoding, is used. This method is itself also described in [FCS], section IV.

The soft decoding principle is to return, when this is possible, a code word c' the most likely possible, and therefore with an error probability. If the method REP is successful in correcting all the errors, which is the case if both biometric data b and b' correspond sufficiently together, the code word c' will be the same as the code word c.

When the decoding method is iterative, a maximum number of iterations may be set, for limiting the decoding time, or else a quality criterion may be defined (based on a threshold on the probability of error). In the case of a soft decoding method as the one in [FCS], a code word c' is always returned: this may be for example the closest code word to the word "c XOR b XOR b'" according to the distance used in the space of code words. If the soft decoding has actually taken place, the legitimate key Kl is exactly found again. If the iterations continue while c'=c, the same word c' will be generated at each iteration. A method for limiting the iterations consist for example of checking whether h(K')=h(Kl), with h a hashing function.

Another example of error decoding for making sure that the decoding method REP systematically generate a key would be to restrain the word found again to information bits (this may be accomplished by only selecting the first I bits of the word found again, if the corrector code is of dimension I), in order to consider them as an original message and encode it in a code word c'.

In another embodiment, an architecture of the helper data system type is used. The helper data system is described in document [HDS], in section 3, and in FIG. 2.

The encoding method GEN is then compliant with the protocol described in this publication giving the possibility of generating, from an initial biometric datum X (corresponding to DBref) and from a randomly generated secret S (corresponding to Kl), a doublet $(W_1, W_2)$.

The decoding REP, may correspond to the decoding DEC described in this document, allowing regeneration of a secret $S'_i$ (corresponding to K') from a test biometric datum Y (corresponding to DBtest). A soft decoding algorithm as described for the Fuzzy Commitment Scheme is applied.

In another embodiment, an architecture of the fuzzy vault type is used. The fuzzy vault is described in the document [FV].

The encoding method GEN corresponds to the LOCK algorithm described in section 3 of this article.

The decoding REP corresponds to the UNLOCK algorithm described in section 3 of this article, using a Reed Solomon decoding algorithm, to which is applied an iterative decoding method, as shown in document [FVDEC].

In another embodiment, an algorithm of the fuzzy extractor type is used. This algorithm is described in document [FC], section 3.2. The decoding may be applied with for example a method of the same type as FCS or Fuzzy Vault, depending on the underlying code to the algorithm.

Further, there exist certain protocols which require specific key formats. In order that the generated keys K' may all be used, the keys must have the right format, i.e. the REP method generates keys in the proper format, which is that of the legitimate key Kl.

The FIDO and ECDSA standards use elliptical curves, which means that Kl is stored for a point KlP of the elliptical curve. Therefore there is no need of any particular form for the cryptographic key.

On the other hand, in the RSA protocols for example, the key should have a predetermined format. The question is to ensure that the key K' systematically generated at the output of the decoding step E2 is compatible with this format. As the legitimate key Kl is selected in order to have this format, it is desired that the generated key K' has this same format.

There exist honey encryption methods, presented in document [HE] which gives the possibility of converting the key into the desired format.

Advantageously, the method therefore comprises an additional step for converting the generated key K' according to a desired format which corresponds to the format of the legitimate key, by means of a honey encryption algorithm. This honey encryption algorithm uses the ciphering of the legitimate key Kl stored in parallel of BDref for finding again the key in the right format. This step is itself also applied by the computer 16.

The encoding step of the legitimate key Kl therefore comprises the following steps: selection of the legitimate key Kl, encryption, called "honey encryption", with the legitimate key Kl with another key Km a so called ("honey") key in order to obtain an encrypted honey legitimate key Klm, and then applying the encoding method GEN with the honey encryption key Km. Are therefore stored in the memory 14 the encrypted legitimate key Kl and the reference datum Dref obtained with the biometric reference datum BDref and the honey key Km.

The decoding step gives the possibility of obtaining a honey generated key K'm. This honey generated key K'm is then used for decrypting the encrypted honey legitimate key Klm. Subsequently to this decryption, the generated key K' is obtained which has the value Kl if the biometric data DBref and DBtest are sufficiently close.

From the generated cryptographic key K', a method for access control F may be applied.

In a first step F1, the method E for generating a cryptographic key as described earlier is applied. At the end of this method E, the generated key K' or data depending on this generated key K', is sent to the server. The sending may be simple, in plain text, or in a masked way, notably by means of proof of knowledge, wherein several data depending on the key are sent, but not the actual key. Mention may be made of the commitment scheme, as in the case of Pedersen (described subsequently).

In a second step F2, the cryptographic key K', or else the data depending on this key, is received by the communication interface 21 of the server 20.

Finally, in a third step F3, the key (or the data depending on the key) received in the preceding step is analyzed by the computer 26 of the server 20. As indicated earlier, it is for example possible that the key K' has been transmitted in clear text, or else has been transmitted in a masked way, notably by a proof of knowledge.

This analysis step F3 gives the possibility of identifying whether the key K' is the legitimate key Kl, in which case the user is authenticated, or else if the key K' is an illegitimate key, in which case the user is not authenticated.

Further, if the authentication is a failure, an alert method F4 is triggered. This alert method F4 indicates that the test biometric datum DBtest does not correspond to the reference biometric datum BDref. The server 20 from now on has the information that an illegitimate user is currently fraudulently using the client-terminal 10.

Subsequently, the alert method F4 may trigger different types of steps, which may be combined with each other and generated by the server 20.

In an embodiment, the server 20 sends to the client-terminal 10 a set value for reacquiring the test biometric datum BDtest.

In an embodiment, a counting variable is incremented by iteration at each reception of an illegitimate key Ki, so that the server 20 is aware of the number of authentication attempts.

In an embodiment, the server 20 sends a set value for locking the client terminal 10 with the client-terminal 10, in order to prevent any connection attempt. For example, the sending of this set value may be accomplished after the counting variable has attained a certain value, for example 5.

In an embodiment, the server 20 may trigger a biased authentication of the client terminal 10 at the server 20, so that the client-terminal 10 behaves like an authenticated terminal. The fraudulent user then does not know that the authentication has been a failure. The server 20 may then monitor the acts of the client-terminal 10, or give him/her access to false data for example.

In an embodiment, the server 20 destroys confidential data which it stores in its memory 22, such as for example data relative to one or several legitimate users of the client-terminal.

In an embodiment, the server 20 generates a set value for destroying data relative to the legitimate user stored in the memory 12 of the client-terminal 10.

In an embodiment: the encoding GEN and the decoding REP are carried out with several keys at a time. The key generation method then includes a step for selecting the "right" key depending on the associated server. A plurality of servers and/or of resources associated with the server(s) is thus defined, and with each server and/or respective resources is associated a legitimate key for access control.

For example, for the secure sketch, the code word c is obtained as the code word derived from $Kl_1 \| Kl_2 \| \ldots \| Kl_n$ (where $\|$ corresponds to the concatenation operator). For example, $Kl_1$ will be used for a first server and/or resource, and $Kl_2$ for the second server and/or resource, etc . . .

After the decoding step E2, a selection step is applied for recovering the desired generated key. This selection step advantageously comprises a deconcatenation of the key obtained $K'_{conc} = K'_1 \| K'_2 \| \ldots \| K'_n$ for recovering the keys $K'_i$ which make it up. The selected «right» key is then used within the scope of an access control with the corresponding server (step E3).

This embodiment gives the possibility to the client-terminal of exchanging with several servers and/or resources of a server while keeping a common encryption procedure.

This embodiment is compatible with others with honeyed encryption, which is then applied on $Kl_1 \| Kl_2 \| \ldots KL_n$.

Figure 4:
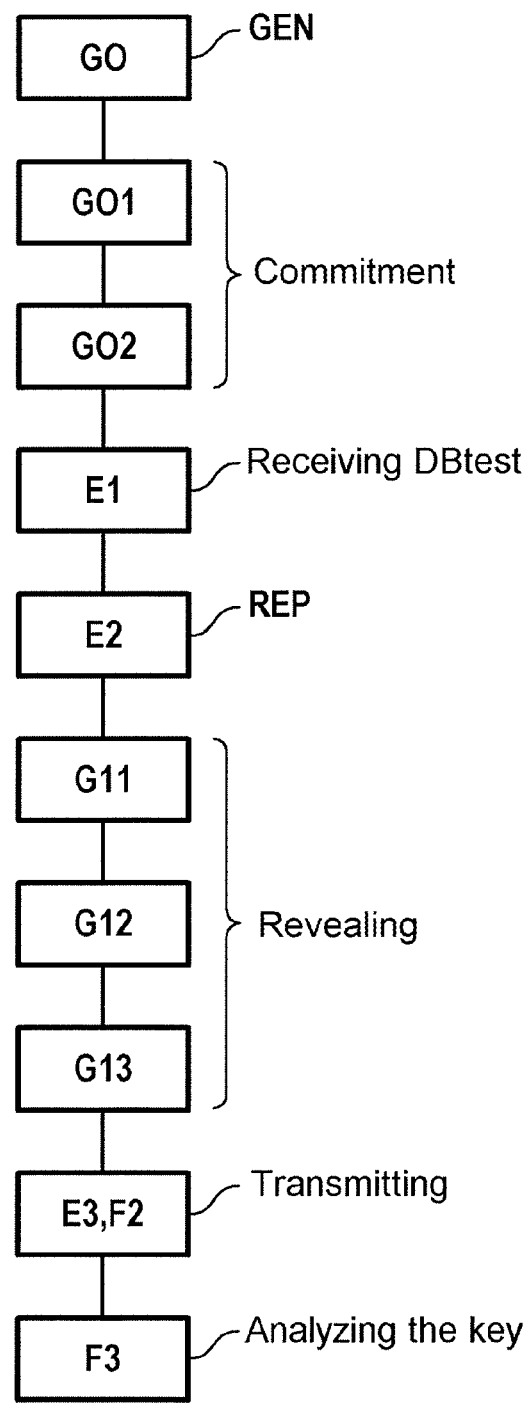
FIG. 4 illustrates different steps of an embodiment with Pedersen commitment scheme.

Now, as mentioned earlier, a particular embodiment by means of Pedersen commitment scheme will now be described, in connection with FIG. 4 and with the reference [CP], and more specifically the reference [CERIAS].

The Pedersen commitment scheme comprises two phases: a commitment phase and a revealing phase.

The enrollment phrase is applied before the method E for generating a cryptographic key.

In a first step G01, the client-terminal generates and stores a random value r, and then, in a second step G02, it generates a commitment MG giving the possibility of not disclosing the legitimate key Kl to the server:

$$MG(r,Kl) = c(r,Kl) = g^{Kl} h^r$$

wherein g and h are such that $\log_g(h)$ is not known. Kl and r correspond to s and t in part 3 of [CP], and to x and r in [CERIAS].

This commitment MG is then sent to the server 20 which stores it in its memory 22.

The revealing phase is accomplished if an authentication method F is triggered.

Prior to step E3, F2 for transmission of the generated cryptographic key K', which is here masked by means of the value r, the client-terminal 10 and the server 20 exchange different data (cf. the data depending on the key, mentioned earlier).

In a sub-step G11, the client-terminal 10 calculates and sends to the server 20:

$$A_1 \cdot A_2 = g^{\alpha_1} \cdot h^{\alpha_2}$$

Wherein $a_1$ and $a_2$ are noted as y and s in [CERIAS] and are random values.

In a sub-step G12, the server 20 generates and sends a random value c to the client-terminal 10 (also noted as c in [CERIAS]).

In a sub-step G13, the client-terminal 10 calculates by means of the cryptographic key K' generated by the decoding method E2.

$$y_1 = \alpha_1 + K' \cdot c \text{ et } y_2 = \alpha_2 + r \cdot c$$

The sending of these data with $A_1 \cdot A_2$ corresponds to the proof of knowledge of K'.

In this step, the key K' becomes masked.

Next, in the transmission step E3, the client terminal 10 sends y1 and y2 to the server 20.

Finally, the analysis F3 step, the key F3 comprises the following verification:

$$g^{y1}h^{y2}=MG^c A_1 A_2$$

This equality is verified if K'=K1.

Such a commitment scheme guarantees authentication with no disclosure of r and of K'.

Other commitment schemes may be contemplated, like a commitment of K1 by storing the value $g^{K1}$ and then the Schnorr proof of knowledge (see [SCH]).

More generally, the authentication may comprise a protocol with no zero-knowledge proof, illustrated by the Pedersen commitment.

A complementary embodiment for exchanges between the server and the client terminal uses an electronic signature, such as in FIDO, or else by using ECDSA or RSA.

REFERENCES

[CRYBIO]: "Biometric Encryption Chapter from the Encyclopedia of Biometrics", of Cavoukian and Stoianov.
[WEAK]: "Privacy Weaknesses in Biometric Sketches" of Simoens, Tuyls and Preneel.
[PROBE]: "ECDSA Key Extraction from Mobile Devices via Nonintrusive Physical Side Channels" of Genkin et al.
[FCS]: "Theoretical and Practical. Boundaries of Binary Secure Sketches", of Bringer et al.
[HDS]: "Practical Biometric Authentication with Template Protection", of Tuyls et al.
[FV]: "A Fuzzy Vault Scheme" of Juels et al.
[FVDEC]: "Algebraic soft-decision decoding of Reed-Solomon codes" of Koetter et al.
[FC]: "Fuzzy Extractors: How to Generate Strong Keys from Biometrics and Other Noisy Data", of Dodis et al.
[HE]: "Honey Encryption: Security Beyond the Brute-Force Bound" of Juels et al.
[CP]: "Non-interactive and information-theoretical secure verifiable secret sharing", of Pedersen.
[CERIAS]: CERIAS Tech Report 2008-28 Privacy-Preserving Management of Transactions' Receipts by Federica Paci, Ning Shang, Elisa Bertino, Sam Kerr, Kevin Steuer, Jr., Jungha Woo Center for Education and Research Information Assurance and Security Purdue University, West Lafayette, Ind. 47907-2086.
[SCH]: Schnorr; "Efficient identification and signatures for smart cards". In CRYPTO '89"

The invention claimed is:

1. A method for generating a cryptographic key for applying an access control method to a resource of a server by a client-terminal,
   the method being applied by the client-terminal, said terminal being configured for communicating with the server,
   the client-terminal comprising a memory in which is stored a reference datum obtained by applying an encoding method to a reference biometric datum and a legitimate cryptographic key allowing authentication of the client-terminal at the server during an access control, the encoding method including use of an error-correcting code, the error-correcting code being an exclusive OR function based on the reference biometric datum and the legitimate cryptographic key,
   the method comprising the following steps:
   receiving a test biometric datum;
   applying a decoding method to the test biometric datum and to the reference datum such that:
      if the test biometric datum corresponds to the reference biometric datum, a first cryptographic key is generated, wherein the first cryptographic key is the legitimate cryptographic key that allows authentication of the client-terminal at the server during an access control,
      if the test biometric datum does not correspond to the reference biometric datum, a second cryptographic key is generated, wherein the second cryptographic key is an illegitimate cryptographic key that does not allow authentication of the client-terminal at the server during an access control,
   wherein:
      the encoding method is applied on a plurality of concatenated legitimate keys,
      the decoding method comprises generating a plurality of third cryptographic keys concatenated with each other, and
      the plurality of generated third cryptographic keys are generated by selecting from a plurality of keys deconcatenated from the first cryptographic key or the second cryptographic key, and
   using the plurality of generated third cryptographic keys for applying an access control method to a resource of the server by the client-terminal, so that information is exchanged between the client-terminal and the server.

2. The method according to claim 1, wherein the test biometric datum is acquired by means of biometric datum acquisition means or by digital generation.

3. The method according to claim 1, wherein the encoding method is of the "secure sketch" type.

4. The method according to claim 3, wherein the encoding method is of the Fuzzy Commitment Scheme.

5. The method according to claim 1, wherein applying a decoding method to the test biometric datum and to the reference datum comprises the application of an error decoding method.

6. The method according to the claim 5, wherein the error decoding method is a soft decoding method having a limited number of iterations.

7. The method according to claim 1, wherein the legitimate cryptographic key has a format adapted for the use of the legitimate cryptographic key in an access control protocol by authentication applied between the client-terminal and the server, and the decoding method is adapted so that the illegitimate cryptographic key has the format of the legitimate cryptographic key.

8. The method according to claim 1, wherein the decoding method and the encoding method comprise honey encryption and decryption steps.

9. The method according to claim 1, wherein applying the decoding method to the test biometric datum and to the reference datum comprises determining a correspondence between the test biometric datum and the reference datum, wherein the test biometric datum and the reference datum correspond when a distance between the test biometric datum and the reference datum is less than a given threshold.

10. The method of claim 1, further comprising:
    sending the generated third cryptographic keys or data depending on the generated third cryptographic keys to the server, analyzing the generated third cryptographic keys or the data depending on the generated third cryptographic key by the server, wherein:

if the generated third cryptographic keys are the first cryptographic key, authenticating the client-terminal at the server and accessing the client-terminal to the resource of the server, if the generated third cryptographic keys are the second cryptographic key, authentication of the client-terminal at the server fails and proceeding to an alert method indicating that the test biometric datum does not correspond to the reference biometric datum.

11. The method according to claim 10, wherein the alert method comprises one or more of the following steps:

storing a number of iterations of receptions of the second cryptographic key;

sending a set value for locking the client-terminal, biased authentication of the client-terminal at the server, so as to be able to monitor said client-terminal, destruction of the data stored on the client-terminal and/or on the server, and sending to the client-terminal a set value for re-acquiring test biometric data.

12. The method according to claim 10, further comprising the application of a protocol for a zero-knowledge proof.

13. The method according to claim 10, wherein the exchanges between the client-terminal and the server comprise the application of an electronic signature.

14. The method according to claim 10, further comprising applying a Pedersen commitment scheme, the commitment scheme including a commitment phase and a revealing scheme, wherein the commitment phase comprises the client-terminal stores a random quantity r, the client-terminal generates a commitment MG in the form of $mG(r,Kl)=g^{Kl}h^r$ and sends the commitment to the server which stores the commitment, wherein Kl is the legitimate cryptographic key, and g and h are such that $\log_g(h)$ is not known, wherein the revealing phase comprises, prior to sending the generated third cryptographic key to the server, the following sub-steps are applied:

the client-terminal sends to the server:

$$A_1 \cdot A_2 = g^{\alpha_1} \cdot h^{\alpha_2}$$

the server generates and sends a random value c to the client-terminal, the client-terminal calculates $$y_1 = \alpha_1 + K' \cdot c \; et \; y_2 = \alpha_2 + r \cdot c$$

wherein K' is the generated third cryptographic key and $a_1$ and $a_2$ are random values, and further comprising $y_1$ and $y_2$ to the server, and wherein analyzing the generated third cryptographic key comprises the following verification:

$$g^{y_1} h^{y_2} = MG^c A_1 A_2.$$

15. The method according to claim 1, wherein the encoding method is of the Helper Data System type.

16. The method according to claim 1, wherein the encoding method is of the Fuzzy Vault type.

17. A calculation unit, the calculation unit comprising a memory, a computer, and a communication interface, the calculation unit adapted for applying a method comprising:

(E0) storing, in the memory, a reference datum obtained by applying an encoding method to a reference biometric datum and a legitimate cryptographic key allowing authentication of a client-terminal at a server during an access control, the encoding method including use of an error-correcting code, the error-correcting code being an exclusive OR function based on the reference biometric datum and the legitimate cryptographic key, (E1) receiving a test biometric datum, (E2) applying a decoding method to the test biometric datum and to the reference biometric datum such that:

if the test biometric datum corresponds to the reference biometric datum, a first cryptographic key is generated, wherein the first cryptographic key is the legitimate cryptographic authentication key, the legitimate cryptographic authentication key allowing authentication of a client-terminal at the server during the access control, if the test biometric datum does not correspond to the reference biometric datum, a second cryptographic key is generated, wherein the second cryptographic key is an illegitimate cryptographic authentication not allowing authentication of the client-terminal at the server during the access control, wherein:

the encoding method is applied on a plurality of concatenated legitimate keys, the decoding method comprises generating a plurality of third cryptographic keys concatenated with each other, and the plurality of generated third cryptographic keys are generated by selecting from a plurality of keys deconcatenated from the first cryptographic key or the second cryptographic key, and (E3) using the generated third cryptographic keys for applying an access control method to a resource of the server by the client-terminal, so that information is exchanged between the client-terminal and the server, said client-terminal being a private device of an individual, the private device being a mobile telephone, a digital tablet, or a personal computer.

* * * * *